United States Patent [19]

Diefenbach

[11] Patent Number: 4,754,097

[45] Date of Patent: Jun. 28, 1988

[54] METATHESIS OF ACETYLENES

[75] Inventor: Steven P. Diefenbach, Baton Rouge, La.

[73] Assignee: Ethyl Corporation, Richmond, Va.

[21] Appl. No.: 55,914

[22] Filed: May 27, 1987

Related U.S. Application Data

[62] Division of Ser. No. 864,318, May 19, 1986, Pat. No. 4,704,377.

[51] Int. Cl.$^4$ .............................................. C07C 2/00
[52] U.S. Cl. .................................................... 585/534
[58] Field of Search ........................................ 585/534

[56] References Cited

PUBLICATIONS

Montreux et al., J. Mol. Catal., 1977, 2, 73–82.
Devarajan et al., J. Organomet. Chem. 1979, 181, 99–104.
Clark et al., J. Am. Chem. Soc. 1978, 100, 6774–6776.
Wengrovius et al., J. Am. Chem. Soc. 1981, 103, 3932–3934.
Sancho et al., J. Mol. Catal. 1982, 15, 75–79.
Schrock et al., Organometallics 1982, 1, 1645–1651.
McCullough et al., J. Am. Chem. Soc. 1984, 106, 4067–4068.
Bencheick et al., J. Mol. Catal. 1982, 15, 93–101.
Lamotte et al., Cryst. Struct. Comm. 1981, 10, 59–64.
Matsuda et al., Acc. Chem. Res. 1984, 17, 51–56.
Cotton et al., J. Coord. Chem., 1971, 1, 161–172.
McCarley et al., Adv. Chem. Ser. 1976, 150, 318–334.
Green et al., J. Chem. Soc. Dalton Trans. 1982, 2519–2525.
Telser et al., J. Inorg. Chem. 1984, 23, 1798–1803.
Katovic et al., J. Am. Chem. Soc. 1975, 97, 5300–5302.
Schrock et al., Inorg. Chem. 1983, 22, 2801–2806.
Santure et al., Inorg. Chem. 1983, 22, 1877–1883.
Santure et al., Inorg. Chem. 1985, 24, 371–378.
Stephenson et al., J. Chem. Soc. 1964, 2538–2541.

*Primary Examiner*—Curtis R. Davis
*Attorney, Agent, or Firm*—John F. Sieberth

[57] ABSTRACT

Described are novel bimetallic complexes particularly useful as homogeneous catalysts for the metathesis of alkynes and metathesizable functionally substituted alkynes, and methods for the preparation of such complexes. The complexes are formed from (i) a Group VI-B metal compound having (a) quadruple metal to metal bonds between a pair of Group VI-B metal atoms at least one of which has an atomic number above 24, and (b) four monovalent anions with a $k_A$ greater than $10^{-14}$, and (ii) a Group III-A phenoxide, a Group III-A alkoxide or a Group IV-B metal alkoxide. Displacement of two of the anions appears to occur during formation of the complex. Usually the complexes can be produced very easily and quickly. All that is required is to establish intimate contact between components (i) and (ii), preferably in an innocuous liquid organic solvent. Addition of a small amount of a nitrile gives a faster and cleaner reaction. In some cases use of slightly elevated temperatures is desirable. A variety of acetylenic compounds were metathesized by use of a variety of these complexes as catalysts. In the course of the work, the following complexes were prepared, isolated, and characterized:

$Mo_2(OAc)_2[Al(OC_6H_4Cl)_4]_2$
$Mo_2(O_2CCMe_3)_2[Al(p-OC_6H_4Cl)_4]_2$
$Mo_2(O_2CCF_3)_2[Al(p-OC_6H_4Cl)_4]_2$
$[Mo_2(CD_3CN)_4(OAc)_2][Al(OC_6H_4Cl)_4]_2$.
$[Mo_2(THF)_4(OAc)_2][Al(OC_6H_4Cl)_4]_2$
$Mo_2(OAc)_2[Al(p-OC_6H_4CH_3)_4]_2$
$Mo_2(OAc)_2[Al(p-OC_6H_4CMe_3)_4]_2$

16 Claims, No Drawings

METATHESIS OF ACETYLENES

This application is a division of application Ser. No. 864,318, filed May 19, 1986, now U.S. Pat. No. 4,704,377.

TECHNICAL FIELD

This invention relates to metathesis of acetylenes, to novel bimetallic complexes especially useful as homogeneous catalysts for such metathesis, and to the synthesis of the complexes.

BACKGROUND

Prior work on homogeneous catalysts for the metathesis of acetylenes is relatively sparse. The first published report on this subject appears to be that of Mortreaux, et al., *J. Mol. Catal.*, 1977, 2, 73. Their work involved use of $Mo(CO)_6$. Devarajan, et al. improved upon and studied this system in some detail. See *J. Organomet. Chem.*, 1979, 181, 99. Most of the more recent work in the field is that of R. R. Schrock and his colleagues at the Massachusetts Institute of Technology who have studied certain compounds or complexes of molybdenum and tungsten.

See for example:
Clark et al., *J. Am. Chem. Soc.* 1978, 100, 6774
Wengrovius et al., *J. Am. Chem. Soc.* 1981, 103, 3932
Sancho et al., *J. Mol. Catal.* 1982, 15, 75
Schrock et al., *Organometallics* 1982, 1, 1645
McCullough et al., *J. Am. Chem. Soc.* 1984, 106, 4067
Schrock, U.S. Pat. No. 4,427,595 (1984)

In addition, a catalyst based on $MoO_2(acac)_2$ has been reported by Bencheick et al., *J. Mol. Catal.* 1982, 15, 93.

It appears that all of the homogeneous catalysts studied to date have involved compounds having a single atom of Mo or W.

Lamotte et al., *Cryst. Struct. Comm.*, 1981, 10, 59, report the structure of a bimetallic complex of dimolybdenum tetraacetate and aluminum triisopropoxide. However no utility of any kind is suggested for the complex.

THE INVENTION

A new type of catalysts for catalytically metathesizing a metathesizable acetylene compound has now been discovered. The catalysts used pursuant to this invention consist essentially of a complex formed from (i) a Group VI-B metal compound having (a) quadruple metal to metal bonds between a pair of Group VI-B metal atoms at least one of which has an atomic number above 24, and (b) four monovalent anions with a $k_A$ greater than $10^{-14}$, and (ii) a Group III-A or IV-B metal alkoxide or phenoxide. Preferably both of the Group VI-B metal atoms have an atomic number above 24, and it is likewise preferred that the $k_A$ of the four monovalent anions be greater than $10^{-12}$. Among the advantages of this invention is that some of the compounds of (i) and many of the compounds of (ii) are available as articles of commerce.

In another of its embodiments this invention provides a new class of catalysts or complex compounds which are particularly effective in the metathesis of metathesizable alkynes. They are compositions or complexes formed from (i) a Group VI-B metal compound having (a) quadruple metal to metal bonds between a pair of Group VI-B metal atoms of atomic number above 24, and (b) four monovalent anions with a $k_A$ greater than $10^{-14}$ (and preferably greater than $10^{-12}$), and (ii) a Group III-A metal phenoxide, particularly aluminum phenoxides. Such complexes have in general the highest activity in the metathesis of metathesizable acetylenes.

The metathesis catalysts used pursuant to this invention usually can be produced very easily and quickly. All that is required is to establish intimate contact between components (i) and (ii). In some cases use of slightly elevated temperatures is desirable. While this reaction may be performed in bulk (no added solvent) it is preferable to synthesize the compounds of this invention in an innocuous liquid organic solvent. Suitable solvents for synthesis (and for metathesis as well) include aromatic, aliphatic and cycloaliphatic hydrocarbons, fluorocarbons, halogenated aromatic hydrocarbons, relatively unreactive halogenated aliphatic hydrocarbons (e.g., methylene dichloride, ethylene dichloride, etc.), ethers, and the like. Acetonitrile, while useful as a reaction solvent in the synthesis of the catalysts, destroys metathesis activity if used as the solvent for the metathesis reaction. Thus in selecting a solvent for the metathesis reaction it is suggested that hydroxylic and dipolar aprotic solvents may be inappropriate choices as they may impair or destroy catalytic activity. In any given case the suitability of a proposed solvent for the production of the complexes and/or for the metathesis reaction may be readily determined by the expedient of performing a few simple tests utilizing the procedures described in the ensuing examples.

As is well known a variety of acetylenic compounds are metathesizable, including unsymmetrical dialkylacetylenes such as 3-heptyne, 3-octyne, 3-nonyne, 4-nonyne and their higher homologs containing up to about 36 or more carbon atoms; arylacetylenes, such as 1-phenyl-1-butyne, 1-phenyl-2-butyne, 1-(p-tolyl)-2-penatyne, and their higher homologs containing up to about 40 or more carbon atoms, and the like. It is also well known that mixtures of suitable metathesizable acetylenic compounds may be co-metathesized to produce a product differing from either reactant. A few illustrative mixtures suitable for co-metathesis include 3-hexyne and 4-octyne, 3-heptyne and 5-decyne, and 1,4-diphenyl-2-butyne and 3-hexyne. Compounds with a single phenyl or a methyl group directly attached to a carbon atom carrying the acetylene triple bond show reduced activity to the catalysts of this invention. Thus preferred acetylenic compounds for use in the methathesis process (including co-metathesis) are those having the general formula:

$$R^1-CH_2-C\ C-CH_2-R^2$$

where $R^1$ and $R^2$ are similar or dissimilar organic groups, such as alkyl, cycloalkyl, cycloalkylalkyl, aryl, aralkyl, alkenyl, cycloalkenyl, alkylthio, cycloalkylthio, cycloalkylalkylthio, arylthio, aralkylthio, alkenylthio, cycloalkenylthio, alkoxy, cycloalkoxy, cycloalkylalkoxy, aryloxy, aralkoxy, alkenoxy, cycloalkenoxy, anilino and ring-substituted anilino, haloalkyl, halocycloalkyl, halocycloalkylalkyl, haloaryl, haloaralkyl, haloalkenyl, halocycloalkenyl, haloalkylthio, halocycloalkylthio, halocycloalkylalkylthio, haloarylthio, haloaralkylthio, haloalkenylthio, halocycloalkenylthio, haloalkoxy, halocycloalkoxy, halocycloalkylalkoxy, haloaryloxy, haloaralkoxy, haloalkenoxy, halocycloalkenoxy, cyanoalkyl, cyanocycloalkyl, cyanocycloalkylalkyl, cyanoaryl, cyanoaralkyl, cyanoalkenyl, cyanocycloalkenyl, trihydrocarbylsiloxy, and other similar groups which do not prevent the metathesis reaction from taking place. Each of the organic groups, $R^1$ and $R^2$ preferably contains up to about 20 carbon atoms, and most preferably up to about 12 carbon atoms. Naturally when only one such acetylenic compound is being metathesized, $R^1$ and $R^2$ should differ from each other so that the metathesis product will differ from the initial acetylenic compound. In co-metathesis, $R^1$ and $R^2$ need only differ from compound to compound in the initial co-metathesis mixture, as for example in the case of a mixture of 3-hexyne and 4-octyne.

The complexes of this invention may be solvated with ethers, or other complexing solvents in which they are formed, or in which component (i) above is formed. Likewise, some of the complexes of this invention may be further complexed with organophosphine ligands, organoarsine ligands, organostibine ligands, or the like, such as the trihydrocarbylphosphines and the bis(dihydrocarbylphosphino)alkanes, and their corresponding arsenic and antimony derivatives.

Component (i) is composed of any salt containing in the molecule two atoms of a Group VI-B metal, at least one of which is molybdenum or tungsten (preferably both are molybdenum and/or tungsten), and the anions of which have a $k_A$ greater than $10^{-14}$ and preferably above $10^{-12}$. Thus, these salts are derivatives of relatively strong acids such as HCl, HNO$_3$, carboxylic acids, and the like. Numerous illustrative examples of such salts and their complexes are given in the ensuing experimental section.

Component (ii) also comprises a wide variety of materials, such as the phenoxides and alkoxides (including cycloalkoxides) of the Group III-A elements (B, Al, Ga, In, Tl) and the alkoxides (including cycloalkoxides, etc.) of the Group IV-B metals (Ti, Zr, Hf). The III-A phenoxides and alkoxides are preferably triphenoxides or trialkoxides (M(OR)$_3$), but may be a diphenoxy, dialkoxy, monophenoxy or monoalkoxy derivative (R'M(OR)$_2$; R$_2$MOR) where R' is a hydrocarbyl group, preferably alkyl or the like and R is a phenoxy or alkoxy group, i.e., phenoxy or substituted phenoxy, or alkoxy or substituted alkoxy). A broad range of substituents can be present on the phenoxy group(s) including hydrocarbon groups, halogen substituents, alkoxy and aryloxy groups, and many others. The IV-B alkoxides are most commonly the tetraalkoxides, although here again one or more of such alkoxy groups may be replaced by a suitable substituent, such as halogen, hydrocarbyl, aryloxy, and the like. Group IV-B phenoxides also form complexes pursuant to this invention although they appear to have little activity as metathesis catalysts for acetylenic compounds. Usually each phenoxy or alkoxy group in component (ii) will contain no more than about 18 carbon atoms, although this is not deemed to constitute a critical limitation as there is no apparent reason why compounds with even larger phenoxy and alkoxy groups may not be used. The same considerations apply to the other organic groups that are optionally present in the phenoxides or alkoxides—these also will usually contain no more than about 18 carbon atoms each, although here again this should not be construed as constituting a critical limitation. Rather this speaks to what is commonly available from the usual commercial sources, and thus goes to matters of convenience and ready availability. Irrespective of its makeup, the important consideration is that component (ii) should be capable of complexing with the Group VI-B compound employed as component (i).

It appears on the basis of the available experimental evidence that components (i) and (ii) when brought together under suitable reaction conditions undergo a displacement reaction in which two of the anions of component (i) are replaced by pair of anionic ligands derived from the Group III-A or IV-A alkoxide or phenoxide employed as component (ii). For example, careful study of the reaction between Mo$_2$(O$_2$CR)$_4$ (R=methyl, tertiary butyl, trifluoromethyl) and Al(OC$_6$H$_4$Cl)$_3$ has resulted in isolation of air sensitive orange crystals of the composition [Mo$_2$(O$_2$CR)$_2$][Al(OC$_6$H$_4$Cl)$_4$]$_2$ as judged from nmr spectra. Isolated yields of these novel complexes of this invention were 60% (R=methyl), 40% (R=tertiary butyl), and 20% (R=trifluoromethyl).

When forming the isolated complexes where R=methyl or tertiary butyl, it was discovered that faster and cleaner reactions occurred when a small amount of acetonitrile was added to the reaction mixture. The role played by the nitrile in enhancing such reactions is unknown.

Accordingly, this invention provides in another of its embodiments the process of producing a complex of (i) a Group VI-B metal compound having (a) quadruple metal to metal bonds between a pair of Group VI-B metal atoms one and preferably both of which have an atomic number above 24, and (b) four monovalent anions with a $k_A$ greater than $10^{-14}$ and preferably above $10^{-12}$, and (ii) a Group III-A phenoxide or IV-B alkoxide which comprises effecting reaction between components (i) and (ii). Preferably the reaction is conducted in the presence of a nitrile, such as acetonitrile, propionitrile, benzonitrile, and the like. Although nitriles tend to inhibit or destroy the catalytic activity of the catalysts of this invention when used as solvents for metathesizing acetylenic compounds, the amount of nitrile which remains complexed with the catalysts of this invention during their synthesis does not appear to interfere with their ability to function in the metathesis reaction.

A number of complexes were prepared in appropriate solvents and used as catalysts for metathesis of various acetylenic hydrocarbons, mainly 3-heptyne. All manipulations were performed under nitrogen or argon by using either Schlenk or dry nitrogen box techniques. Tetrahydrofuran (THF) was dried, distilled from sodium/benzophenone, and stored under nitrogen over 4 angstrom molecular sieves. Other solvents were passed through an alumina column, dried over 4 angstrom molecular sieves, deoxygenated with argon, and stored in the dry box. Acetylenes were obtained from standard sources and were passed through an alumina column, dried over 4 angstrom molecular sieves, and stored in the dry box. Hydrogen, obtained from Mathieson, was used as received. Alkylaluminum compounds were commercial products of Ethyl Corporation and were used as received. Dimolybdenum tetraacetate (Mo$_2$(OAc)$_4$) and dichrominum tetraacetate (Cr$_2$(OAc)$_4$ 2H$_2$O) were obtained from Aldrich Chemical Company. Prepared by literature methods were the following:

Mo$_2$(O$_2$CCF$_3$)$_4$ (Cotton, F. A.; Norman, J. G. *J. Coord. Chem.* 1971, 1, 161);

Mo$_2$(OPv)$_4$ (i.e., dimolybdenum tetrapivalate) (McCarley, T. E.; Templeton, J. L.; Colburn, T. J.; Katovic, V.; Hoxmeier, R. J. *Adv. Chem. Ser.* 1976, 150, 318);

Mo₂Cl₂(THF)₂(OAc)₂, Mo₂Cl₂(PPh₃)₂(OAc)₂, Mo₂Cl₂(PEt₃)₂(OAc)₂, Mo₂Cl₄(DPPM)₂ (DPPM=1,2-bis(diphenylphosphino)methane) and Mo₂Cl₄(PEt₃)₄ (Green, M. L. H.; Parkin, G.; Bashkin, J.; Fail, J.; Prout, K. *J. Chem. Soc. Dalton Trans.* 1982, 2519);

[Mo₂(CH₃CN)₄(OAc)₂][CF₃SO₃]₂ (Telser, J. Drago, R. S. *J. Inorg. Chem.* 1984, 23, 1798);

MoW(OPv)₄ (molybdenum tungsten tetrapivalate) (Katovic, V.; Templeton, J. L.; Hoxmeier, R. J.; McCarley, R. E. *J. Am. Chem. Soc.* 1975, 97, 5300);

WCl₄ (Schrock, R. R.; Sturgeoff, L. G.; Sharp, P. R. *Inorg. Chem.* 1983, 22, 2801);

W₂(O₂CCF₃)₄ (Santure, D. J.; McLaughlin, K. W.; Huffman, J. C.; Sattelberger, A. P. *Inorg. Chem.* 1983, 22, 1877); and W₂(OPv)₄ (ditungsten tetrapivalate) (Santure, D. J.; Huffman, J. C.; Sattelberger, A. P. *Inorg. Chem.* 1985, 24, 371).

Other reagents were obtained from standard sources and were opened and stored in the dry box.

NMR spectra (¹H, ¹³C, and ¹⁹F) were obtained on a Nicolet NC360NB spectrometer. Chemical shifts (¹H and ¹³C) are reported in ppm relative to the residual protons or carbons in the solvent. Coupling constants are reported in Hertz. Mass spectra were obtained on a Finnigan spectrometer. Gas chromotography was performed on a Varian 3700 gas chromatograph connected to a Hewlett-Packard 3390A integrator.

EXAMPLE 1

Preparation of Mo₂(OAc)₂[Al(OC₆H₄Cl)₄]₂

Al(p-OC₆H₄Cl)₃ was prepared in situ by stirring 1.530 (11.90 mmol) of p-ClC₆H₄OH and 0.543 mL (3.96 mmol) of AlEt₃ (added over a 10 minute period) in 20-mL of toluene for 3 hours. To the resulting white milky suspension was added 0.427 g (0.99 mmol) of Mo₂(OAc)₄ and 0.052 mL (1.0 mmol) of CH₃CN. After stirring for 48 hours at 30° C., the reaction mixture was filtered through a pad of Celite to remove solids. The red-yellow filtrate was concentrated to a volume of about 2–3 mL under a stream of nitrogen and allowed to stand for 3 hours. The yellow-orange crystals of product were filtered, washed three times with 5 mL or petroleum ether (b.p. 35°–60° C.) and dried under a 15 psi stream of nitrogen to yield 0.753 g (55%) of Mo₂(OAc)₂[Al(OC₆H₄Cl)₄]₂. ¹H NMR(360 MHz, C₆D₆) 2.38(S, 6H, O₂CCH₃); 7.105(A₂B₂ J=65.0, 10.8 Hz, 8H, OC₆H₄Cl); 6.67 (A₂B₂ J=176.9, 10.8 Hz, 8H, OC₆H₄Cl); 6.525(A₂B₂ J=43.3, 10.8 Hz, 16H, OC₆H₄Cl). ¹³C NMR (90.5 MHz, C₆D₆): 22.87(O₂CCH₃); 187.03(O₂CCH₃); 156.28, 156.22, 151.72 (AlO<u>C</u>C₂H₂C₂H₂CCl); 121.69, 121.05, 120.71 (AlOCC₂H₂<u>C</u>₂H₂CCl); 130.35, 130.23, 129.75 (AlOC<u>C</u>₂H₂C₂H₂CCl); 130.55, 125.61, 124.99 (AlOCC₂H₂C₂H₂<u>C</u>Cl).

EXAMPLE 2

Preparation of Mo₂(O₂CCMe₃)₂[Al(p-OC₆H₄Cl)₄]₂

Al(p-OC₆H₆Cl)₃ was prepared in situ by adding 0.163 mL (1.19 mmol) AlEt₃ dropwise to 0.45 g (3.57 mmol) of p-ClC₆H₄OH in 8.0 mL of toluene and stirring for 3.0 hours. To the white suspension of Al(OC₆H₄Cl)₃ was added 0.177 g (0.297 mmol) of Mo₂(O₂CCMe₃)₄ and 0.008 mL (0.153 mmol) of CH₃CN. After stirring the mixture at 30° C. for 24–48 hours, a bright orange-red solution was obtained. The solution was filtered through a pad of Celite then evaporated to dryness. The dark orange/white residue was extracted 4 times with 5 mL portions of a toluene-petroleum ether (b.p. 35°–60° C.) (1:4 v/v mixture and the extract solutions were combined and filtered through a Celite pad. A dark orange oil was obtained by evaporation of the solvent from the filtrate. This oil was dissolved in a minimum amount of toluene and the solution was carefully layered with petroleum ether. Yellow-orange needles of the product were present after 16 hours. These were filtered, washed twice with 3 mL portions of petroleum ether and dried yielding 0.177 g (41%) of Mo₂(O₂CCMe₃)₂[Al(p-OC₆H₄Cl)₄]₂. ¹H NMR (360 MHz, C₆D₆) 1.42(S, 18H, O₂CCMe₃); 6.625(A₂B₂, J=187.8, 10.8 Hz, 8H, OC₆H₄Cl); 6.575(A₂B₂, J=57.8, 10.8 Hz, 16H, OC₆H₄Cl); 6.975(A₂B₂, J=137.2, 10.83 Hz, 8H, OC₆H₄Cl).

EXAMPLE 3

Preparation of Mo₂(O₂CCF₃)₂[Al(p-OC₆H₄Cl)₄]₂

Al(p-OC₆H₄Cl)₃ was prepared in situ by adding 0.101 mL (0.74 mmol), AlEt₃ dropwise to 285 mg (2.22 mmol) p-ClC₆H₄OH in 6 mL of toluene and stirring for 3 hours. To the white suspension was added 119 mg (0.185 mmol) Mo₂(O₂CCF₃)₄. The mixture was then heated at 80° C. for 18 hours. The reaction mixture was dark orange in color and contained a white solid. The mixture was filtered through a pad of Celite to remove the solids and the filtrate was then evaporated to dryness leaving an orange brown residue. The residue was dissolved in a minimum amount of toluene and hexane was carefully layered over the solution. Orange crystals of product were present after 2 hours. These were filtered, washed twice with 2 mL portions of hexane, then dried to yield 55 mg (20%) of Mo₂(O₂CCF₃)₂[Al(p-OC₆H₄Cl)₄]₂.¹H NMR (360MHz, C₆D₆): 6.488 (A₂B₂, J=97.5, 9.0 Hz, 16H, OC₆H₄Cl); 6.855 (A₂B₂, J=149.9, 9.0 Hz, 16H, OC₆H₄Cl). ¹⁹F NMR (339 MHz, C₆D₆, Cl₃CF external reference): 5.45 (S, O₂CCF₃). The integral ratio between -O₂CCF₃ and -OC₆H₄Cl was not obtained.

EXAMPLE 4

Reaction of Mo₂(OAc)₂[Al(OC₆H₄Cl)₄]₂ with CD₃CN

Mo₂(OAc)₂[Al(OC₆H₄Cl)₄]₂ (9 mg; 0.007 mmol) was dissolved in 0.8 mL of CD₃CN to give a bright purple solution. The solution was filtered into a NMR tube and the spectrum recorded at 360 MHz (22° C.). An A₂B₂ pattern was seen for the AlOC₆H₄Cl protons (6.895 J=104.7, 7.2 Hz, 32H) and a singlet was seen for the O₂CCH₃ proton (2.90, 6H) which is consistent with the formation of:

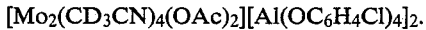
[Mo₂(CD₃CN)₄(OAc)₂][Al(OC₆H₄Cl)₄]₂.

EXAMPLE 5

Reaction of Mo₂(OAc)₂[Al(p-OC₆H₄Cl)₄]₂ with THF

Mo₂(OAc)₂[Al(OC₆H₄Cl)₄]₂ (5 mg; 0.004 mmol) was dissolved in about 0.6 mL of C₆D₆ then filtered into a NMR tube. To the orange solution was added 0.1 mL of THF. An immediate color change to red-purple was observed. The spectrum was recorded at 360 MHz (22° C.). An A₂B₂ pattern was seen for the AlOC₆H₄Cl protons (6.835, J=101.1, 10.4 Hz, 32H) and a singlet was seen for the O₂CCH₃ protons (2.76, 6H) which is consistent with the formation of

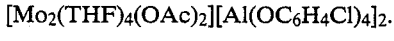
[Mo₂(THF)₄(OAc)₂][Al(OC₆H₄Cl)₄]₂.

EXAMPLE 6

Preparation of Mo$_2$(OAc)$_2$[Al(p-OC$_6$H$_4$CH$_3$)$_4$]$_2$

Al(p-OC$_6$H$_4$CH$_3$)$_3$ was prepared in situ by adding 0.576 mL (4.21 mmol) AlEt$_3$ dropwise to a solution of 1.37 g (12.63 mmol) p-CH$_3$C$_6$H$_4$OH in 20 mL of toluene and stirring for 3 hours. To the resulting white suspension was added 0.45 g (1.05 mmol) of Mo$_2$(OAc)$_4$ and 0.052 mL (1.0 mmol) of CH$_3$CN. After stirring for 7 days at 30° C. the reaction mixture was filtered through a pad of Celite to remove solids. Solvent was removed the red-brown filtrate under a stream of nitrogen. The resulting dark red-brown oil was crystallized from a mixture of CH$_2$Cl$_2$ and hexane. The sticky material was recrystallized from CH$_2$Cl$_2$/hexane to afford 0.58 g (46%) of dark yellow crystals of Mo$_2$(OAc)$_2$[Al(p-OC$_6$H$_4$CH$_3$)$_4$]$_2$. $^1$H NMR(360 MHz, C$_6$D$_6$); 2.92(S, 6H, O$_2$CCH$_3$); 2.11(S, 12H, OC$_6$H$_4$CH$_3$); 1.67(S, 12H, OC$_6$H$_4$CH$_3$); 6.780(A$_2$B$_2$ J=235, 7.2 Hz, 16H, OC$_6$H$_4$CH$_3$); 6.985(A$_2$B$_2$ J=25.3, 7.2 Hz, 16H, OC$_6$H$_4$CH$_3$).

EXAMPLE 7

Preparation of Mo$_2$(OAc)$_2$[Al(p-OC$_6$H$_4$CMe$_3$)$_4$]$_2$

Aluminum tris(p-tert-butylphenoxide), Al(p-OC$_6$H$_4$CMe$_3$)$_3$ was prepared in situ by adding 0.60 mL (4.4 mmol) of AlEt$_3$ dropwise to a solution of 1.97 g (13.08 mmol) p-Me$_3$CC$_6$H$_4$OH in 25 mL of toluene and stirring overnight at 30° C. To the resulting clear and colorless solution was added 0.468 g (1.09 mmol) of Mo$_2$(OAc)$_4$ and 0.052 mL (1.0 mmol) of CH$_3$CN. After stirring at 30° C. for ca. 72 hours, the solution was red-yellow and contained a white precipitate. The solution was filtered through a pad of Celite to remove solids and then evaporated under a stream of nitrogen to a dark colored oil. The oil was extracted 3 times with 10 mL portions of pentane and the combined extract solutions were filtered through Celite. The filtrate was concentrated to precipitate a light yellow powder. The powder was filtered, washed with a minimum amount of pentane, and then dried under a stream of N$_2$ to give 0.35 g (21%) of Mo$_2$(OAc)$_2$[Al(p-OC$_6$H$_4$CMe$_3$)$_4$]$_2$. $^1$H NMR(360 MHz, C$_6$D$_6$) 1.00(S, 36H, OC$_6$H$_4$CMe$_3$); 1.20(S, 18H, OC$_6$H$_4$CMe$_3$); 1.25(S, 18H, OC$_6$H$_4$CMe$_3$); 2.63(S, 6H, O$_2$CCH$_3$); 6.92(A$_2$B$_2$ J=141, 7.2 Hz, 16H, OC$_6$H$_4$CMe$_3$); 6.93(A$_2$B$_2$ J=90.3, 7.2 Hz 8H, OC$_6$H$_4$CMe$_3$); 7.43(A$_2$B$_2$ J=32, 7.2 Hz, 8H, OC$_6$H$_4$CMe$_3$).

Metathesis reactions were performed using a variety of catalysts of this invention (preformed as in the above Examples or prepared in situ) and representative acetylenic hydrocarbons. These reactions were performed by first adding an appropriate quantity of a bimetal complex (either component (i) or a preformed complex of this invention) to a two dram vial equipped with a small stirring bar and then dissolving the complex in a suitable solvent. In those cases where, pursuant to this invention, component (ii) was being used to form the catalyst in situ. component (ii) was added at this point followed by addition of the desired acetylenic substrate. In experiments where either a Hpreformed bimetal complex of this invention or only a component (i) bimetal complex was used, the substrate was added directly to the solution of the particular bimetal complex. Reactions carried out at 32° C. were performed in a dry box by simply stirring the solution. The reactions carried out at elevated temperatures were performed by removing the tightly capped reaction vial from the dry box and placing it in an aluminum block heater set at the desired temperature. Reactions were monitored and products were identified by GC or GC/MS.

The conditions and results of metathesis reactions of this invention using 3-heptyne are summarized in Table I. Table II gives the conditions and results of reactions involving metathesis of 2-heptyne with various catalysts of this invention. In Table III are shown the conditions and results of reactions in which 1-phenyl-1-butyne was metathesized with catalysts of this invention. The results in Table IV indicate that no metathesis occurs when using only a component (i) bimetal complex. In these tables the following additional abbreviations are used:

ACN=acetonitrile
MDC=methylene dichloride
Bz=benzene
Tol=toluene
BTN=butyronitrile
ClBz=chlorobenzene
Pent=pentane
ns=no separate solvent added; reaction run neat
na=no activity wa observed

TABLE I

3-Heptyne Metathesis Reactions
2 EtC≡CPr→EtC≡CEt + PrC≡CPr

| Ex. No. | Component (i) (mmoles) | Component (ii) (mmoles) | Alkyne mmoles | Conditions | Percent Metathesis* |
|---|---|---|---|---|---|
| 8 | Mo$_2$Cl$_2$(THF)$_2$(OAc)$_2$ (.028) | Al(OC$_6$H$_4$Cl)$_3$ (.112) | 1.0 | THF/55°/6h | 100 |
| 9 | Mo$_2$Cl$_2$(THF)$_2$(OAc)$_2$ (.033) | Al(OC$_6$H$_4$Cl)$_3$ (.066) | 1.0 | THF/55°/6h | 100 |
| 10 | Mo$_2$Cl$_2$(THF)$_2$(OAc)$_2$ (.031) | Al(OC$_6$H$_4$Cl)$_3$ (.062) | 1.0 | THF/32°/3h | 83 |
| 11 | Mo$_2$Cl$_2$(THF)$_2$(OAc)$_2$ (.035) | Et$_2$Al(OC$_6$H$_4$Cl) (.070) | 1.0 | THF/55°/3h | 20 |
| 12 | Mo$_2$Cl$_2$(THF)$_2$(OAc)$_2$ (.035) | EtAl(OC$_6$H$_4$Cl)$_2$ (.070) | 1.0 | THF/55°/1h | 72 |
| 13 | Mo$_2$Cl$_2$(THF)$_2$(OAc)$_2$ (.038) | Al(OC$_6$H$_4$Cl)$_3$ (.076) | 1.0 | THF/55°/1h | 100 |
| 14 | Mo$_2$Cl$_2$(THF)$_2$(OAc)$_2$ (.030) | Al(OC$_6$H$_5$)$_3$ (.030) | 1.0 | THF/55°/1h | 57 |
| 15 | Mo$_2$Cl$_2$(THF)$_2$(OAc)$_2$ (.030) | Al(OC$_6$H$_4$Cl)$_3$ (.060) | 1.0 | ACN/55°/2h | na |
| 16 | Mo$_2$Cl$_2$(THF)$_2$(OAc)$_2$ (.028) | Al(OC$_6$H$_4$Cl)$_3$ (.056) | 2.8 | THF/55°/20h | 79 |
| 17 | Mo$_2$Cl$_2$(THF)$_2$(OAc)$_2$ (.033) | Al(OC$_6$H$_4$Cl)$_3$ (.066) | 3.3 | MDC/55°/19h | 77 |
| 18 | Mo$_2$Cl$_2$(THF)$_2$(OAc)$_2$ (.031) | Al(OC$_6$H$_4$F)$_3$ (.062) | 3.1 | THF/55°/24h | 68 |
| 19 | Mo$_2$Cl$_2$(THF)$_2$(OAc)$_2$ (.026) | Al(OC$_6$H$_5$)$_3$ (.055) | 2.6 | THF/55°/24h | 33 |
| 20 | Mo$_2$Cl$_2$(THF)$_2$(OAc)$_2$ (.039) | Al(OC$_6$H$_5$)$_3$ (.102) | 1.0 | THF/55°/20h | 90 |
| 21 | Mo$_2$Cl$_2$(THF)$_2$(OAc)$_2$ (.026) | Ti(O—i-Pr)$_4$ (.052) | 1.0 | THF/55°/18h | 41 |
| 22 | Mo$_2$Cl$_2$(THF)$_2$(OAc)$_2$ (.029) | Ti(O—i-Pr)$_4$ (.060) | 1.0 | Bz/55°/18h | na |
| 23 | Mo$_2$Cl$_2$(THF)$_2$(OAc)$_2$ (.021) | Zr(O—i-Pr)$_4$ i-PrOH (.049) | 1.0 | THF/55°/18h | 7 |
| 24 | Mo$_2$Cl$_2$(THF)$_2$(OAc)$_2$ (.039) | Ti(O-n-Bu)$_4$ (.08) | 1.0 | THF/55°/16h | 11 |
| 25 | Mo$_2$Cl$_2$(THF)$_2$(OAc)$_2$ (.034) | Al(O-n-Bu)$_4$ (.083) | 1.0 | THF/55°/66h | 61 |
| 26 | Mo$_2$Cl$_2$(THF)$_2$(OAc)$_2$ (.102) | Ti(O—C$_6$H$_4$Cl)$_4$ (.137) | 2.0 | THF/55°/18h | na |
| 27 | Mo$_2$Cl$_2$(THF)$_2$(OAc)$_2$ (.038) | Ti(O—C$_6$H$_4$Cl)$_4$ (.034) | 1.0 | THF/55°/18h | trace |
| 28 | Mo$_2$Cl$_2$(THF)$_2$(OAc)$_2$ (.025) | Al(O-t-bu)$_3$ (.19) | 1.0 | THF/55°/16h | 13 |

TABLE I-continued

3-Heptyne Metathesis Reactions
2 EtC≡CPr→EtC≡CEt + PrC≡CPr

| Ex. No. | Component (i) (mmoles) | Component (ii) (mmoles) | Alkyne mmoles | Conditions | Percent Metathesis* |
|---|---|---|---|---|---|
| 29 | $Mo_2Cl_2(PPh_3)_2(OAc)_2$ (.016) | $Al(OC_6H_4Cl)_3$ (.064) | 1.0 | THF/55°/16h | 100 |
| 30 | $Mo_2Cl_2(PPh_3)_2(OAc)_2$ (.018) | $Al(OC_6H_4Cl)_3$ (.036) | 1.0 | THF/55°/1h | 47 |
| 31 | $Mo_2Cl_2(PPh_3)_2(OAc)_2$ (.020) | $Al(OC_6H_4Cl)_3$ (.040) | 1.0 | ACN/55°/1h | na |
| 32 | $Mo_2Cl_2(PEt_3)_2(OAc)_2$ (.04) | $Al(OC_6H_4Cl)_3$ (.08) | 1.0 | THF/55°/72h | 100 |
| 33 | $Mo_2Cl_4(DPPM)_2$ (.021) | $Al(OC_6H_4Cl)_3$ (.042) | 1.0 | THF/55°/72h | 100 |
| 34 | $Mo_2Cl_4(DPPM)_2$ (.017) | $Al(OC_6H_4Cl)_3$ (.034) | 1.0 | THF/55°/18h | 37 |
| 35 | $Mo_2Cl_4(PEt_3)_4$ (.023) | $Al(OC_6H_4Cl)_3$ (.046) | 1.0 | THF/55°/72h | 9 |
| 36 | $[Mo_2(CH_3CN)_4(OAc)_2][CF_3SO_3]_2$ (.021) | $Al(OC_6H_4Cl)_3$ (.042) | 2.1 | THF/55°/19h | 81 |
| 37 | $[Mo_2(CH_3CN)_4(OAc)_2][CF_3SO_3]_2$ (.027) | $Al(OC_6H_4Cl)_3$ (.162) | 2.7 | THF/55°/18h | 100 |
| 38 | $[Mo_2(CH_3CN)_4(OAc)_2][CF_3SO_3]_2$ (.023) | $Ti(O-i-Pr)_4$ (.046) | 1.5 | THF/32°/18h | 35 |
| 39 | $Mo_2(OAc)_4$ (.037) | $Al(OC_6H_5)_3$ (.144) | 3.7 | THF/55°/24h | 35 |
| 40 | $Mo_2(OAc)_4$ (.037) | $Al(OC_6H_4F)_3$ (.150) | 3.7 | THF/55°/24h | 81 |
| 41 | $Mo_2(OAc)_4$ (.046) | $Al(OC_6H_4Cl)_3$ (.184) | 4.6 | THF/55°/5h | 88 |
| 42 | $Mo_2(OAc)_4$ (.047) | $Al(OC_6H_4Br)_3$ (.188) | 4.7 | THF/55°/3h | 81 |
| 43 | $Mo_2(OAc)_4$ (.036) | $Al(OC_6H_4Cl)_3$ (.144) | 3.6 | Tol/55°/24h | 77 |
| 44 | $Mo_2(O_2CCF_3)_4$ (.064) | $Al(OC_6H_4F)_3$ (.256) | 6.4 | THF/55°/18h | 11 |
| 45 | $Mo_2(O_2CCF_3)_4$ (.039) | $Al(OC_6H_4Cl)_3$ (.158) | 3.9 | Tol/55°/24h | 78 |
| 46 | $Mo_2(O_2CCF_3)_4$ (.033) | $Al(OC_6H_4Cl)_3$ (.132) | 1.0 | THF/32°/48h | 7 |
| 47 | $Mo_2(OPv)_4$ (.029) | $Al(OC_6H_4Cl)_3$ (.116) | 2.9 | THF/55°/18h | 79 |
| 48 | $MoW(OPv)_4$ (.029) | $Al(OC_6H_4Cl)_3$ (.116) | 2.9 | THF/55°/18h | 30 |
| 49 | $MoW(OPv)_4$ (.016) | $Al(OC_6H_4Cl)_3$ (.064) | 1.0 | THF-BTN/55°/18h | 89 |
| 50 | $W_2(O_2CCF_3)_4$ (.029) | $Al(OC_6H_4Cl)_3$ (.064) | 1.0 | THF/32°/66h | 100 |
| 51 | $W_2(O_2CCF_3)_4$ (.033) | $Al(OC_6H_4Cl)_3$ (.132) | 1.0 | THF/32°/48h | 64 |
| 52 | $W_2(O_2CCF_3)_4$ (.023) | $Al(OC_6H_4Cl)_3$ (.092) | 1.0 | THF-BTN/32°/16h | 38 |
| 53 | $W_2(OPv)_4$ (.054) | $Al(OC_6H_4Cl)_3$ (.22) | 1.53 | THF/32°/2h | 50 |
| 54 | $W_2(OPv)_4$ (.054) | $Al(OC_6H_4Cl)_3$ (.22) | 1.53 | THF/32°/18h | 100 |
| 55 | $W_2(OPv)_4$ (.056) | $Al(OC_6H_4Cl)_3$ (.223) | 1.53 | ClBz/32°/18h | trace |
| 56 | $W_2(OPv)_4$ (.026) | $Al(O-i-Pr)_3$ (.104) | 1.53 | THF/32°/18h | na |
| 57 | $W_2(OPv)_4$ (.038) | $Ti(O-i-Pr)_4$ (.150) | 2.33 | THF/32°/72h | na |
| 58 | $[Mo_2(OAc)_2][Al(OC_6H_4Cl)_4]_2$ $1.56 \times 10 - 2$ M | — | 1.56 | ClBz/55°/5h | 71 |
| 59 | $[Mo_2(OAc)_2][Al(OC_6H_4Cl)_4]_2$ (.022) | — | 2.0 | THF/55°/3h | 21 |
| 60 | $[Mo_2(OAc)_2][Al(OC_6H_4Cl)_4]_2$ (.025) | — | 2.0 | Tol/55°/2h | 17 |
| 61 | $[Mo_2(OAc)_2][Al(OC_6H_4Cl)_4]_2$ (.023) | $PPh_3$ (.092) | 1.53 | ClBz/70°/2h | 60 |
| 62 | $[Mo_2(OPv)_2][Al(OC_6H_4Cl)_4]_2$ (.014) | — | 1.0 | ClBz/55°/6h | 51 |
| 63 | $[Mo_2(OCCF_3)_2][Al(OC_6H_4Cl)_4]_2$ (.007) | — | 1.53 | THF/60°/5h | 24 |
| 64 | $[Mo_2(OAc)_2)][Al(p-OC_6H_4CH_3)_4]_2$ (.025) | — | 1.0 | THF/70°/18h | 81 |
| 65 | $[Mo_2(OAc)_2)][Al(p-OC_6H_4CMe_3)_4]_2$ (.016) | — | 1.0 | Pent/32°/18h | 58 |
| 66 | $[Mo_2(OAc)_2)][Al(p-OC_6H_4CMe_3)_4]_2$ (.017) | — | 7.6 | ns/70°/18h | 14 |

*Percent Metathesis = sum of 3-hexyne & 4-octyne divided by 3-heptyne multiplied by 100 (data obtained from vpc area %)

TABLE II

2-Heptyne Metathesis Reactions
2 MeC≡CBu→MeC≡CMe + BuC≡CBu

| Ex. No. | Component (i) (mmoles) | Component (ii) (mmoles) | Alkyne mmoles | Conditions | Percent Metathesis |
|---|---|---|---|---|---|
| 67 | $Mo_2Cl_2(THF)_2(OAc)_2$ (.019) | $Al(OC_6H_4Cl)_3$ (.038) | 1.9 | THF/55°/18h | 10 |
| 68 | $Mo_2(OAc)_4$ (.047) | $Al(OC_6H_4Cl)_3$ (.188) | 4.7 | THF/55°/20h | 100 |
| 69 | $[Mo_2(CH_3CN)_4(OAc)_2][CF_3SO_3]_2$ (.019) | $Ti(O-i-Pr)_4$ (.077) | 1.5 | THF/60°/18h | 17 |
| 70 | $[Mo_2(OAc)_4]_2[Al(OC_6H_4Cl)_4]_2$ (.053) | — | 4.0 | THF/55°/5h | ca20 |
| 71 | $[W_2(O_2CCF_3)_4]$ (.018) | $Al(OC_6H_4Cl)_3$ (.073) | 1.0 | THF/32°/48h | ca20 |

TABLE III

1-Phenyl-1-Butyne Metathesis Reactions
2 PhC≡CEt  PhC≡CPh + EtC≡CEt

| Ex. No. | Component (i) (mmoles) | Component (ii) (mmoles) | Alkyne mmoles | Conditions | Percent Metathesis |
|---|---|---|---|---|---|
| 72 | $Mo_2Cl_2(THF)_2(OAc)_2$ (.046) | $Al(OC_6H_4Cl)_3$ (.092) | 1.0 | THF/55°/16h | 88 |
| 73 | $Mo_2Cl_2(THF)_2(OAc)_2$ (.035) | $Al(OC_6H_4Cl)_3$ (.070) | 1.0 | THF/55°/5h | 81 |
| 74 | $Mo_2(OAc)_4$ (.043) | $Al(OC_6H_4Cl)_3$ (.172) | 1.8 | THF/55°/18h | 16 |

TABLE IV

Attempted 3-Heptyne Metathesis Reactions
2 EtC≡CPr  EtC≡CEt + PrC≡CPr

| Ex. No. | Component (i) (mmoles) | Component (ii) (mmoles) | Alkyne mmoles | Conditions | Percent Metathesis |
|---|---|---|---|---|---|
| 75 | $Mo_2Cl_2(THF)_2(OAc)_2$ (.044) | — | 1.0 | THF/55°/5h | na |
| 76 | $Mo_2Cl_2(THF)_2(OAc)_2$ (.024) | — | 1.0 | ClBz/55°/16h | na |
| 77 | $Mo_2Cl_2(PPh_3)_2(OAc)_2$ (.027) | — | 1.0 | THF/55°/16h | na |
| 78 | $Mo_2Cl_4(DPPM)_4$ (.015) | — | 1.0 | THF/55°/16h | na |

TABLE IV-continued

Attempted 3-Heptyne Metathesis Reactions
2 EtC≡CPr ⇌ EtC≡CEt + PrC≡CPr

| Ex. No. | Component (i) (mmoles) | Component (ii) (mmoles) | Alkyne mmoles | Conditions | Percent Metathesis |
|---|---|---|---|---|---|
| 79 | Mo$_2$(OAc)$_4$ (.047) | — | 7.6 | ClBz/55°/18h | na |
| 80 | [Mo$_2$(THF)$_2$(OAc)$_2$][CF$_3$SO$_3$]$_2$ (.045) | — | 1.0 | THF/55°/18h | na |
| 81 | [Mo$_2$(CH$_3$CN)$_4$(OAc)$_2$][CF$_3$SO$_3$]$_2$ (.022) | — | 2.4 | THF/55°/18h | na |
| 82 | W$_2$(O$_2$CCF$_3$)$_4$ (.018) | — | 1.0 | THF/55°/5h | na |

It will be appreciated that the values for the percent metathesis given in Tables II and III above (and in Table V hereinafter) were developed in the same fashion as the values presented in Table I. In other words, using the vpc area percent data on the reaction products, the sum of the quantities of the products formed was divided by the quantity (or quantities) of the initial acetylenic reactant(s) remaining in the product, and this value was multiplied by 100.

As previously noted above, acetylenic compounds containing functional substituents can be metathesized with the catalysts of this invention so long as the substituents do not prevent the reaction from taking place. As a rule of thumb, the more remote the substituent is from the acetylenic triple bond, the less influence it is likely to exert on the reaction. For example, a halogen atom in the beta position relative to the triple bond inhibits metathesis. On the other hand, halogen in the gamma position has been found relatively innocuous to metathesis.

Table V summarizes the results of a group of runs in which various functionalized acetylenic compounds were successfully metathesized pursuant to this invention using the complex Mo$_2$(OAc)$_2$[Al(OC$_6$H$_4$Cl)$_4$]$_2$ as the catalyst. The same general experimental procedure was used as described above with reference to the runs reported in Tables I through IV.

| Ex. No. | Product(s) |
|---|---|
| 86 | 1-methoxy-2-pentyne |
| 87 | 1-phenoxy-2-pentyne |
| 88 | 1-methoxy-4-thiophenoxy-2-butyne (and oligomer) |
| 89 | no reaction observed |
| 90 | 1-(2,6-diisopropylanilino)-2-hexyne |
| 91 | 1-(2,6-diisopropylanilino)-4-methoxy-2-butyne |
| 92 | 1,8-dichloro-4-octyne and 4-octyne |
| 93 | 1,8-dicyano-4-octyne and 4-octyne |
| 94 | no reaction observed |
| 95 | 1-acetoxy-4-methoxy-2-butyne |
| 96 | 5-acetoxy-1-methoxy-2-pentyne and 1-methoxy-2-hexyne |
| 97 | 1,6-bis(tert-butyldimethylsiloxy)-3-hexyne and 4-octyne |

It is interesting to compare the results of Example 88 with Example 89 and of Example 95 with Example 94. In both cases the methoxy-substituted alkyne rendered the mixture amenable to co-metathesis whereas an unsubstituted alkyne did not. Other alkynes which did not metathesize under the conditions tested were 1-acetoxy-3-heptyne, a mixture of 3-heptyn-1-ol and 3-heptyne, 1-trimethylsiloxy-3-heptyne, a mixture of 1-trimethylsiloxy-3-heptyne and 1,4-dimethoxy-2-butyne, a mixture of tetrahydropyranyl-3-heptyne and 1,4-dimethoxy-2-butyne, a mixture of 1,4-dichloro-2-butyne and 1,4-dimethoxy-2-butyne, a mixture of 1-dimethylamino-2-pentyne and 1,4-dimethoxy-2-butyne, a mixture of 1-

TABLE V

Metathesis of Functionalized Acetylenes

| Ex. No. | Functional Group | Functionalized Acetylenic Compound(s) Used (mmoles) | mmoles of Catalyst | Conditions | Percent Metathesis |
|---|---|---|---|---|---|
| 83 | Conjugated olefin | 2-methyl-1-hepten-3-yne (1.0) | 0.018 | MDC/32°/18h | 10 |
| 84 | Nonconjugated olefin | 1-nonen-4-yne (1.0) | 0.014 | THF/32°/18h | 18 |
| 85 | Nonconjugated olefin | 1-nonen-4-yne (1.0) | 0.014 | ClBz/32°/18h | 89 |
| 86 | Methyl ether | 1,4-dimethoxy-2-butyne (1.0) & 3-hexyne (1.0) | 0.011 | ClBz/32°/72h | 100 |
| 87 | Phenyl ether | 1,4-diphenoxy-2-butyne (0.5) & 3-hexyne (0.5) | 0.011 | THF/32°/72h | 60 |
| 88 | Thiophenyl ether | 1,4-dithiophenoxy-2-butyne (0.4) & 1,4-dimethoxy-2-butyne (1.0) | 0.012 | THF/32°/18h | ca50 |
| 89 | Thiophenyl ether | 1,4-dithiophenoxy-2-butyne (0.4) & 3-hexyne (1.0) | 0.011 | THF/70°/18h | na |
| 90 | Substituted aniline | 1,4-di-(2,6-diisopropylanilino)-2-butyne (0.4) & 3-hexyne (1.0) | 0.012 | THF/70°/18h | ca50 |
| 91 | Substituted aniline | 1,4-di-(2,6-diisopropylanilino)-2-butyne (0.4) & 1,4-dimethoxy-2-butyne (1.0) | 0.012 | THF/70°/24h | ca50 |
| 92 | Gamma-chloride | 1-chloro-4-octyne (1.0) | 0.013 | ClBz/65°/18h | 100 |
| 93 | Gamma-cyano | 1-cyano-4-octyne (1.0) | 0.020 | THF/70°/48h | 41 |
| 94 | Acetoxy | 1,4-diacetoxy-2-butyne (1.0) & 3-heptyne (0.5) | 0.015 | ClBz/32°/120h | na |
| 95 | Acetoxy | 1,4-diacetoxy-2-butyne (1.0) & 1,4-dimethoxy-2-butyne (1.0) | 0.013 | THF/70°/72h | 20 |
| 96 | Acetoxy | 1-acetoxy-3-heptyne (1.0) & 1,4-dimethoxy-2-butyne (1.0) | 0.025 | THF/70°/48h | trace |
| 97 | Trialkylsiloxy | 1-tert-butyldimethylsiloxy-3-heptyne (1.0) | 0.015 | THF/60°/4h | 37 |

The products formed in the Examples given in Table V are as follows:

| Ex. No. | Product(s) |
|---|---|
| 83 | 2,5-dimethyl-1,5-hexadien-3-yne and 4-octyne |
| 84 | 1,7-octadien-4-yne and 5-decyne |
| 85 | 1,7-octadien-4-yne and 5-decyne | trimethylsilyl-1-propyne and 1,4-dimethoxy-2-butyne, a mixture of methyl 2-hexynoate and 1,4-dimethoxy-2-butyne, a mixture of 1-bromo-1-heptyne and 1,4-dimethoxy-2-butyne, and a mixture of 1-methoxy-1-octyne and 1,4-dimethoxy-2-butyne.

It can be seen from the foregoing that a wide variety of additional novel complexes may be produced and utilized as metathesis catalysts in accordance with this invention. A few additional exemplary materials include:

Mo$_2$(OAc)$_2$[Al(p-OC$_6$H$_4$C$_9$H$_{19}$)$_4$]$_2$
Mo$_2$(O$_2$CCMe$_3$)$_2$[Al(p-OC$_6$H$_4$C$_5$H$_{11}$)$_4$]$_2$
Mo$_2$(O$_2$CCF$_3$)$_2$[Al(p-OC$_6$H$_4$C$_5$H$_{11}$)$_4$]$_2$
W$_2$(OAc)$_2$[Al(p-OC$_6$H$_4$C$_2$H$_5$)$_4$]$_2$
W$_2$(O$_2$CCMe$_3$)$_2$[Al(p-OC$_6$H$_4$C$_5$H$_{11}$)$_4$]$_2$
W$_2$(O$_2$CCF$_3$)$_2$[Al(p-OC$_6$H$_4$C$_5$H$_{11}$)$_4$]$_2$
MoCr(OAc)$_2$[Al(OC$_6$H$_5$)$_4$]$_2$
MoCr(OAc)$_2$[Al(OC$_6$H$_4$Cl)$_4$]$_2$
MoCr(OAc)$_2$[Al(OC$_6$H$_4$CH$_3$)$_4$]$_2$
MoCr(OAc)$_2$[Al(OC$_6$H$_4$C(CH$_3$)$_3$)$_4$]$_2$
MoCr(O$_2$CCMe$_3$)$_2$[Al(p-OC$_6$H$_4$C$_2$H$_5$)$_4$]$_2$
MoCr(O$_2$CCF$_3$)$_2$[Al(p-OC$_6$H$_4$C$_5$H$_{11}$)$_4$]$_2$
WCr(OAc)$_2$[Al(OC$_6$H$_5$)$_4$]$_2$
WCr(OAc)$_2$[Al(OC$_6$H$_4$Cl)$_4$]$_2$
WCr(OAc)$_2$[Al(OC$_6$H$_4$CH$_3$)$_4$]$_2$
WCr(OAc)$_2$[Al(OC$_6$H$_4$C(CH$_3$)$_3$)$_4$]$_2$
WCr(O$_2$CCMe$_3$)$_2$[Al(p-OC$_6$H$_4$C$_2$H$_5$)$_4$]$_2$
WCr(Ophd 2CCF$_3$)$_2$[Al(p-OC$_6$H$_4$C$_5$H$_1$)$_4$]$_2$
MoW(OAc)$_2$[Al(OC$_6$H$_5$)$_4$]$_2$
MoW(OAc)$_2$[Al(OC$_6$H$_4$Cl)$_4$]$_2$
MoW(OAc)$_2$[Al(OC$_6$H$_4$CH$_3$)$_4$]$_2$
MoW(OAc)$_2$[Al(OC$_6$H$_4$C(CH$_3$)$_3$)$_4$]$_2$
MoW(O$_2$CCMe$_3$)$_2$[Al(p-OC$_6$H$_4$C$_2$H$_5$)$_4$]$_2$
MoW(O$_2$CCF$_3$)$_2$[Al(p-OC$_6$H$_4$C$_5$H$_{11}$)$_4$]$_2$ One group of preferred complexes of this invention have the general empirical formula:

$$M_2(anion)_2[Al(OR)_4]_2$$

where M is molybdenum or tungsten and the two M's are the same or are different from each other, anion is a monocarboxylic acid anion, and R is phenyl or a phenyl group substituted by alkyl or halogen radicals or both, and the three R's are the same or are different from each other.

Another group of preferred complexes of this invention have the general empirical formula:

$$M_2(anion)_2[Al(OR)_4]_2$$

where M is molybdenum or tungsten and the two M's are the same or are different from each other, anion is a monocarboxylic acid anion, and R is an alkyl group substituted by cycloalkyl, aryl, halocycloalkyl, haloaryl or halogen radicals, and the three R's are the same or are different from each other.

Still other groups of preferred complexes are set forth in the foregoing disclosure and ensuing claims.

As this invention is susceptible to considerable variation in its practice without departing from its true spirit and scope, it is not intended that this invention be unduly limited to the exemplifications hereinbefore presented. Rather, what is intended to be embodied in the coverage of this invention is as set forth in the ensuing claims and the equivalents thereof.

What is claimed is:

1. In a process of catalytically metathesizing a metathesizable acetylene compound, the improvement in which the catalyst consists essentially of a catalyst formed from (i) a Group VI-B metal compound having (a) quadruple metal to metal bonds between a pair of Group VI-B metal atoms at least one of which has an atomic number above 24, and (b) four monovalent anions with a $k_A$ greater than $10^{-14}$, and (ii) a Group III-A phenoxide, Group III-A alkoxide, or IV-B metal alkoxide.

2. A process of claim 1 in which the catalyst consists essentially of a complex formed from (i) a molybdenum compound having (a) quadruple metal to metal bonds between a pair of molybdenum atoms, and (b) four monovalent anions with a $k_A$ greater than $10^{-12}$, and (ii) an aluminum trialkoxide, an aluminum triphenoxide, an alkylaluminum dialkoxide, or a titanium tetraalkoxide.

3. A process of claim 1 in which the catalyst consists essentially of a complex formed from (i) a tungsten compound having (a) quadruple metal to metal bonds between a pair of tungsten atoms, and (b) four monovalent anions with a $k_A$ greater than $10^{-12}$, and (ii) an aluminum trialkoxide, an aluminum triphenoxide, an alkylaluminum dialkoxide, or a titanium tetraalkoxide.

4. A process of claim 1 in which the catalyst consists essentially of a complex formed from (i) a molbdenum-tungsten compound having (a) quadruple metal to metal bonds between a pair of Group VI-B metal atoms, one of which is a molybdenum atom and the other of which is a tungsten atom, and (b) four monovalent anions with a $k_A$ greater than $10^{-12}$, and (ii) an aluminum trialkoxide, an aluminum triphenoxide, an alkylaluminum dialkoxide, or a titanium tetraalkoxide.

5. A process of claim 1 in which (ii) used in forming the catalyst is an aluminum phenoxide.

6. A process of claim 1 in which (ii) used in forming the catalyst is an aluminum triphenoxide.

7. A process of claim 1 in which the catalyst consists essentially of a complex of the general empirical formula:

$$M_2(anion)_2[Al(OR)_4]_2$$

where M is molybdenum or tungsten and the two M's are the same or are different from each other, anion is a monocarboxylic acid anion, and R is phenyl or a phenyl group substituted by alkyl or halogen radicals or both, and the three R's are the same or are different from each other.

8. A process of claim 1 conducted in a liquid reaction medium.

9. A process of claim 1 conducted in a hydrocarbon, fluorocarbon, halogenated hydrocarbon or ether reaction medium.

10. A process of claim 1 conducted in a chlorinated hydrocarbon or ether reaction medium.

11. A process of claim 1 conducted in a chlorobenzene or methylene dichloride reaction medium.

12. A process of claim 1 further characterized by co-metathesizing at least two metathesizable acetylenic compounds in a liquid reaction medium.

13. A process of catalytically metathesizing one or more metathesizable acetylenic compounds which comprises forming a catalyst from (i) a Group VI-B metal compound having (a) quadruple metal to metal bonds between a pair of Group VI-B metal atoms of atomic number above 24, and (b) four monovalent anions with a $k_A$ greater than $10^{-12}$, and (ii) a Group III-A phenoxide, Group III-A alkoxide, or Group IV-B metal alkoxide, and conducting the metathesis in the presence of the catalyst so that metathesis of the metathesizable acetylenic compound(s) takes place.

14. A process of claim 13 further characterized by forming said catalyst from (i) a Group VI-B metal compound having (a) quadruple metal to metal bonds between a pair of Group VI-B metal atoms of atomic number above 24, and (b) four monovalent anions with a $k_A$ greater than $10^{-12}$, and (ii) an aluminum phenoxide, an aluminum alkoxide or a titanium alkoxide, and performing the metathesis in an innocuous liquid reaction medium.

15. A process of claim 14 further characterized by forming said catalyst in a liquid reaction medium.

16. A process of claim 14 further characterized by co-metathesizing at least two metathesizable acetylenic compounds in the liquid reaction medium.

* * * * *

UNITED STATES PATENT AND TRADEMARK OFFICE
CERTIFICATE OF CORRECTION

PATENT NO. : 4,754,097
DATED : JUNE 28, 1988
INVENTOR(S) : STEVEN P. DIEFENBACH

It is certified that error appears in the above-identified patent and that said Letters Patent is hereby corrected as shown below:

Cover page, references cited, reads "Montreux et al" should read -- Mortreux et al --.

Cover page, references cited, U.S. 4,427,595, dated January, 1984, Schrock, was omitted.

Column 5, line 34, reads "1.530 (11.90mmol)" and should read -- 1.530g (11.90 mmol) --.

Column 5, line 47, reads ". . ., $C_6D_6$) 2.38. . ." and should read -- , $C_6D_6$):2.38. . . --.

Column 7, line 44 reads ". . . $C_6D_6$)" and should read -- . . . $C_6D_6$): --.

Column 8, line 15 reads "either a Hpreformed" and should read -- either a preformed --.

Column 8, line 45 reads "activity wa observed" and should read -- activity was observed --.

Example 25 reads "Al(O-$\underline{n}$-Bu)$_4$" and should read -- Al(O-$\underline{i}$-Pr)$_3$ --.

Table III reads "2 PhC ≡ CEt PhC≡ . . ." and should read -- 2 PhC ≡ CEt $\rightleftharpoons$ PhC≡... --.

Table IV reads "2 EtC ≡CPr EtC . . ." and should read -- 2 EtC≡CPr $\rightleftharpoons$ EtC . . . --.

UNITED STATES PATENT AND TRADEMARK OFFICE
CERTIFICATE OF CORRECTION

PATENT NO. : 4,754,097
DATED : June 28, 1988
INVENTOR(S) : STEVEN P. DIEFENBACH

It is certified that error appears in the above-identified patent and that said Letters Patent is hereby corrected as shown below:

Column 13, line 21, reads "WCr $(Ophd\ 2CCF_3)_2 [Al(p-OC_6H_4C_5H_1)4]_2$" and should read -- WCr $(O_2CCF_3)_2 [Al(p-OC_6H_4C_5H_{11})4]_2$ --.

Column 14, line 57, reads "more.metathesizable" -- and should read -- more metathesizable --.

Signed and Sealed this

Fifth Day of December, 1989

Attest:

JEFFREY M. SAMUELS

Attesting Officer    Acting Commissioner of Patents and Trademarks